(12) United States Patent
Claypool

(10) Patent No.: US 9,682,600 B2
(45) Date of Patent: Jun. 20, 2017

(54) ROTATABLE RAIL DEVICE AND METHOD FOR PLACING A TRUCK ONTO A SET OF TRACKS

(71) Applicant: Mass. Electric Construction Co., Omaha, NE (US)

(72) Inventor: James Claypool, Bellevue, NE (US)

(73) Assignee: Mass. Electric Construction CO., Omaha, NE (US)

( * ) Notice: Subject to any disclaimer, the term of this patent is extended or adjusted under 35 U.S.C. 154(b) by 402 days.

(21) Appl. No.: 13/931,192

(22) Filed: Jun. 28, 2013

(65) Prior Publication Data
US 2015/0000554 A1    Jan. 1, 2015

(51) Int. Cl.
*B60F 1/04*    (2006.01)

(52) U.S. Cl.
CPC ............ *B60F 1/04* (2013.01); *B60F 2301/10* (2013.01)

(58) Field of Classification Search
CPC ........ B60F 1/043; B60F 2301/04; B60F 1/04; B60F 1/046; B60F 2301/10; B60F 1/00; B60F 2301/00; B62D 1/265
USPC ........................................ 105/3, 4.1, 4.2, 4.3
See application file for complete search history.

(56) References Cited

U.S. PATENT DOCUMENTS

| 3,263,628 A | 8/1966 | Grove |
| 3,332,362 A | 7/1967 | Fisher |
| 3,653,332 A | 4/1972 | Olson, Sr. et al. |
| 4,048,925 A | 9/1977 | Storm |
| 5,186,109 A | 2/1993 | Madison |
| 5,220,870 A * | 6/1993 | Larson .................. B61D 3/184 105/159 |
| 6,932,173 B2 * | 8/2005 | Henderson ........... B62D 13/005 105/72.2 |

FOREIGN PATENT DOCUMENTS

| CA | 2 499 611 | * 4/2004 |
| WO | WO 95/29822 | 11/1995 |

OTHER PUBLICATIONS

PCT International Search Report and Written Opinion—PCT/US2014/41956, dated Sep. 24, 2014 (8 pages).

* cited by examiner

*Primary Examiner* — Mark Le
(74) *Attorney, Agent, or Firm* — DLA Piper LLP (US)

(57) ABSTRACT

A rail gear system and a method for placing a truck on railroad tracks are provided in which the truck can be placed into the set of railroad tracks using a short siding. The rail gear may be mounted on a back portion of the truck and may rotate so that the a rear portion of the truck rotates about the track when the rail gear is engaged with the set of railroad tracks.

8 Claims, 17 Drawing Sheets

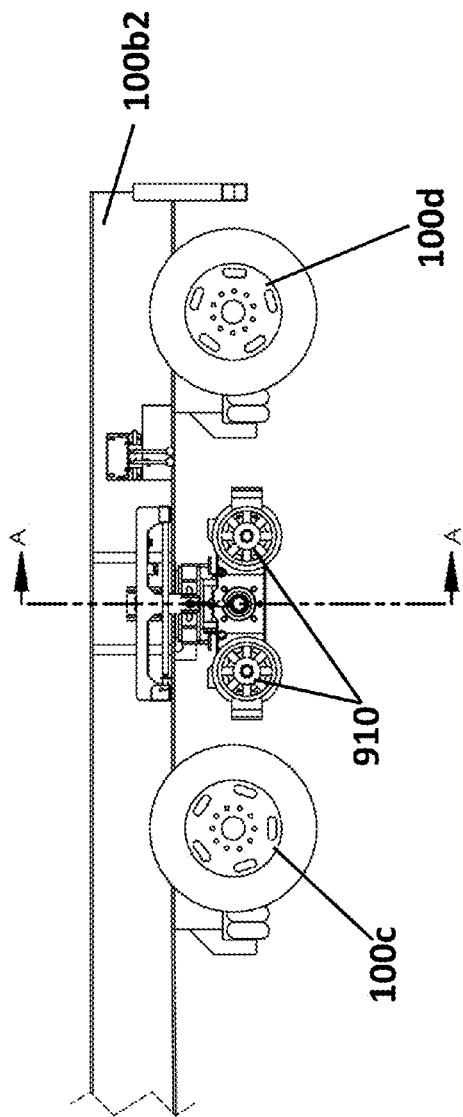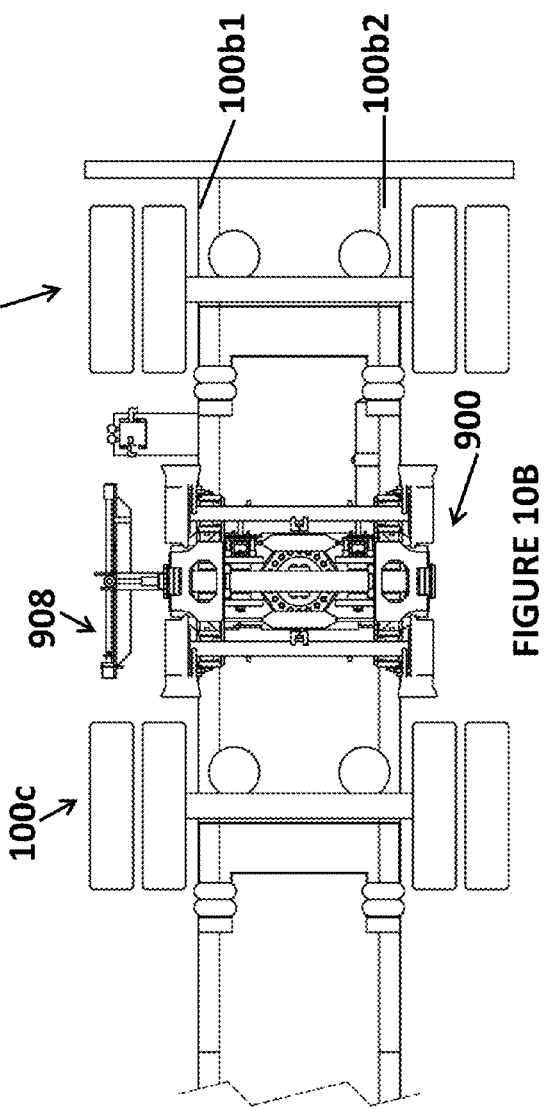
FIGURE 10A
FIGURE 10B

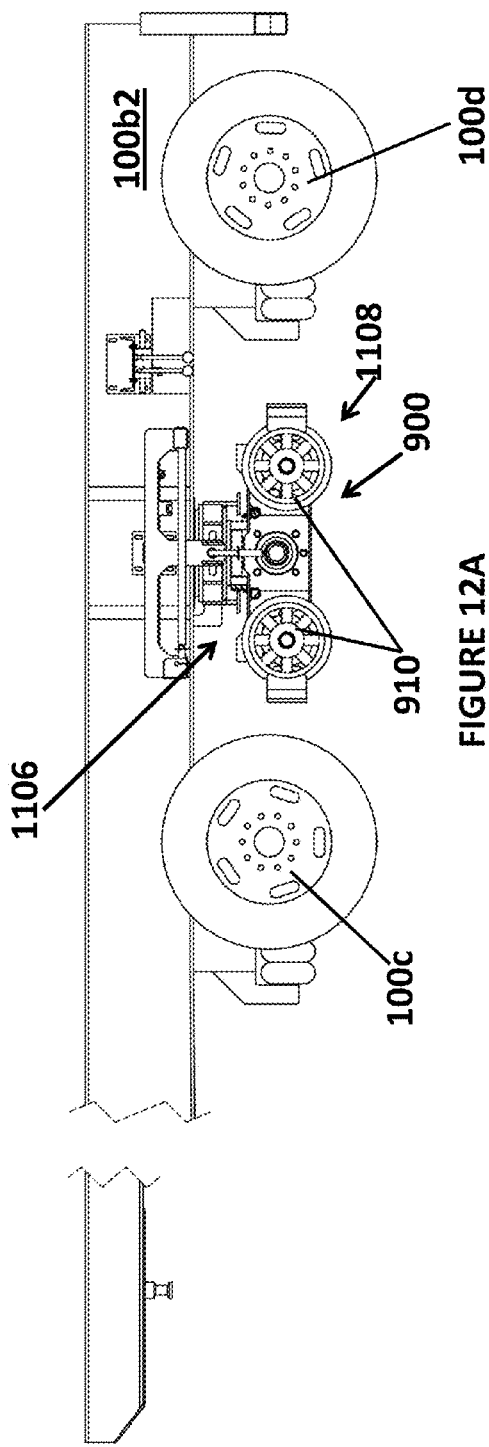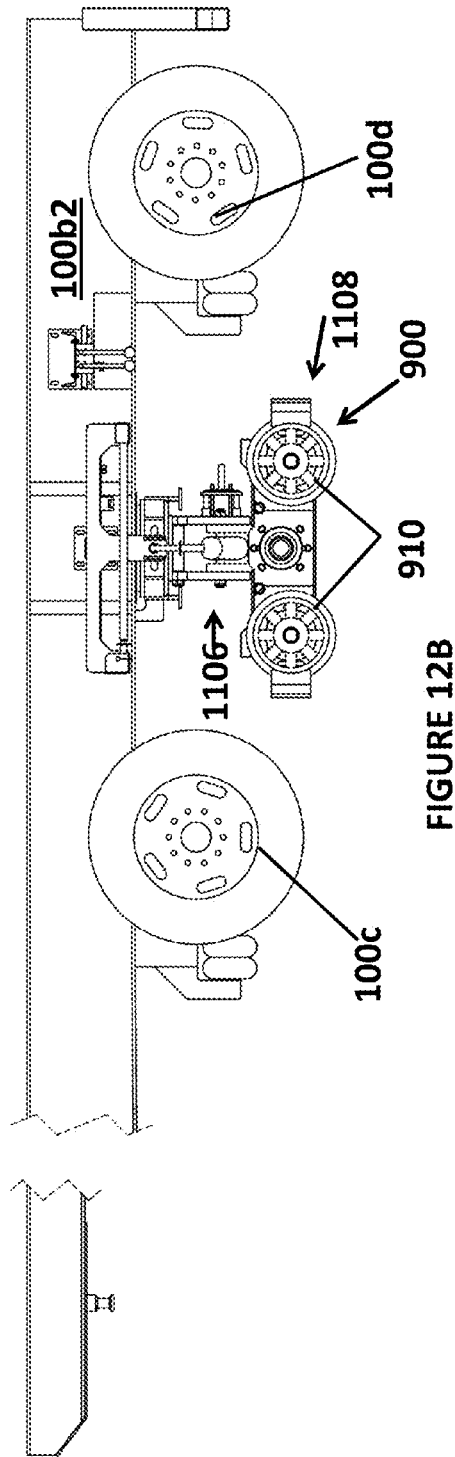

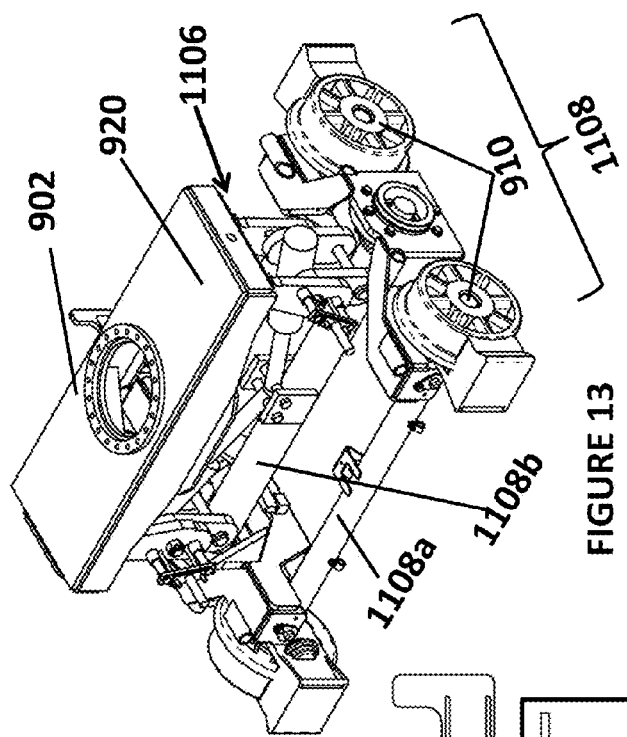
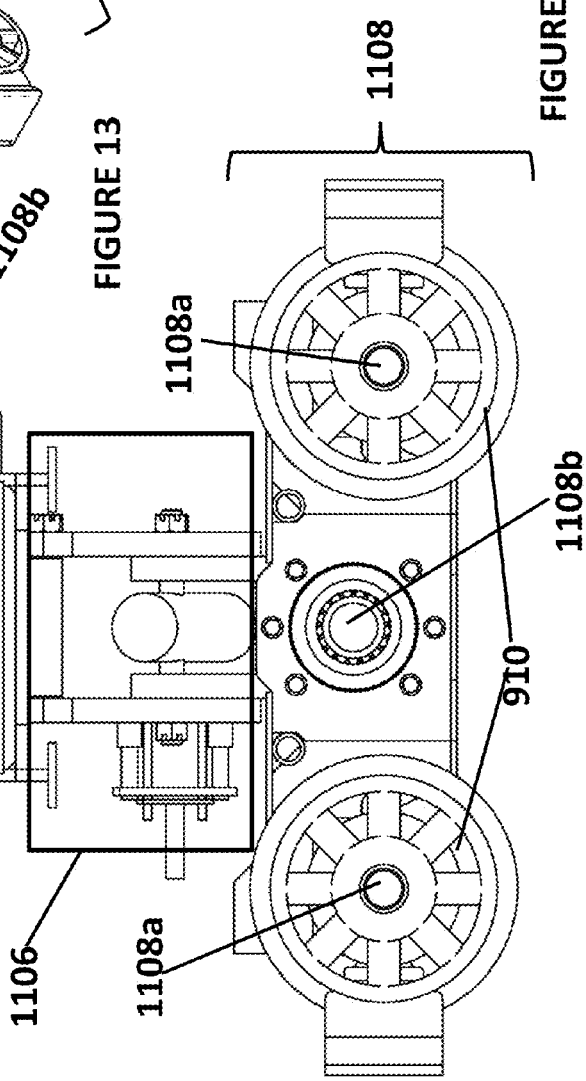
FIGURE 13
FIGURE 14

ROTATABLE RAIL DEVICE AND METHOD FOR PLACING A TRUCK ONTO A SET OF TRACKS

FIELD

The disclosure relates generally to a rotatable rail device and a method for using the rotatable rail device to place a truck onto a set of tracks.

BACKGROUND

There are often situations in which it is desirable to be able to get a truck, such as a tractor trailer truck onto a set of tracks so that the truck can run along the tracks, such as for example, in order to repair the set of tracks. As another example, if catenary cable for an electric powered railway car is being installed onto a set of tracks, a catenary cable installation truck may be placed onto the set of tracks to install the standards that support the cable and then also install the cable.

In a typical situation, the truck that is going to be placed onto the set of railroad tracks may be a tractor trailer truck that may be 60-70 feet long. In order to move that truck on the set of railroad tracks, a long siding along the set of railroad tracks is needed. For example, for the tractor trailer, a siding of more than 90 feet may be required. However, such a long siding is not always available.

In the case of installing overhead cable along the set of tracks, the truck will need to be periodically removed from the tracks to replenish the materials and wire so that it is desirable to provide a way to get a truck onto the set of railroad tracks when a long siding is not available.

BRIEF DESCRIPTION OF THE DRAWINGS

FIGS. 10A and 10B are a close up side view and top view, respectively of the rotatable rail device;

FIG. 12A is a side view of the rotatable rail device in a unengaged position;

FIG. 12B is a side view of the rotatable rail device in an engaged position;

FIGS. 13 and 14 are a perspective view and a side view, respectively of the rotatable rail device in an engaged position;

DETAILED DESCRIPTION OF ONE OR MORE EMBODIMENTS

The disclosure is particularly applicable to a rotatable rail device installed on a tractor trailer truck and a method for placing that tractor trailer truck with the rotatable rail device onto a set of railroad tracks and it is in this context that the disclosure will be described. It will be appreciated, however, that the rotatable rail device has greater utility since it may be used to place other types of trucks onto a set of railroad tracks and may also be with other types of tracks. Furthermore, the rotatable rail device may be separated from the truck.

Figure 1:
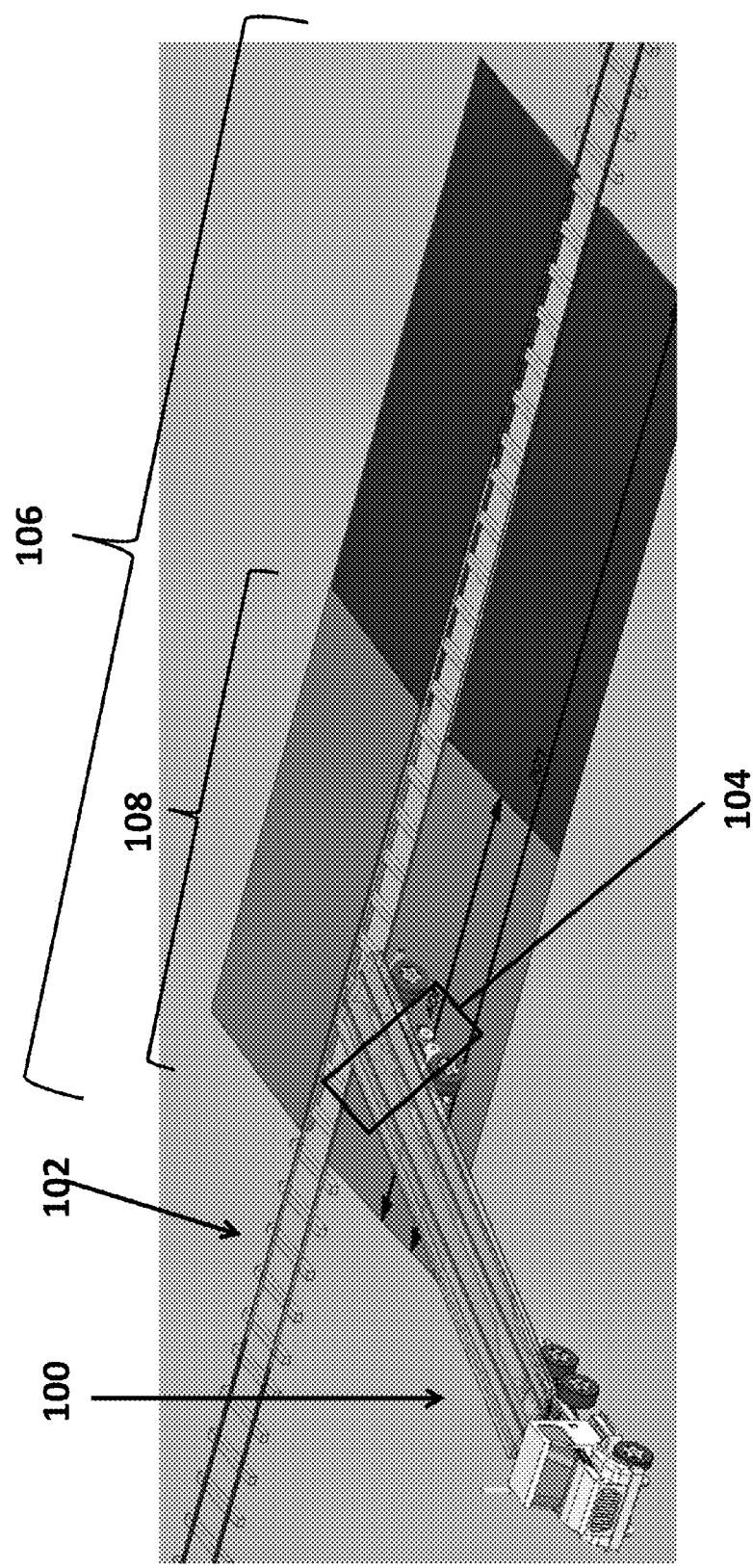
FIG. 1 illustrates a truck being placed onto a set of railroad tracks using a rotatable rail device.
Figure 8:
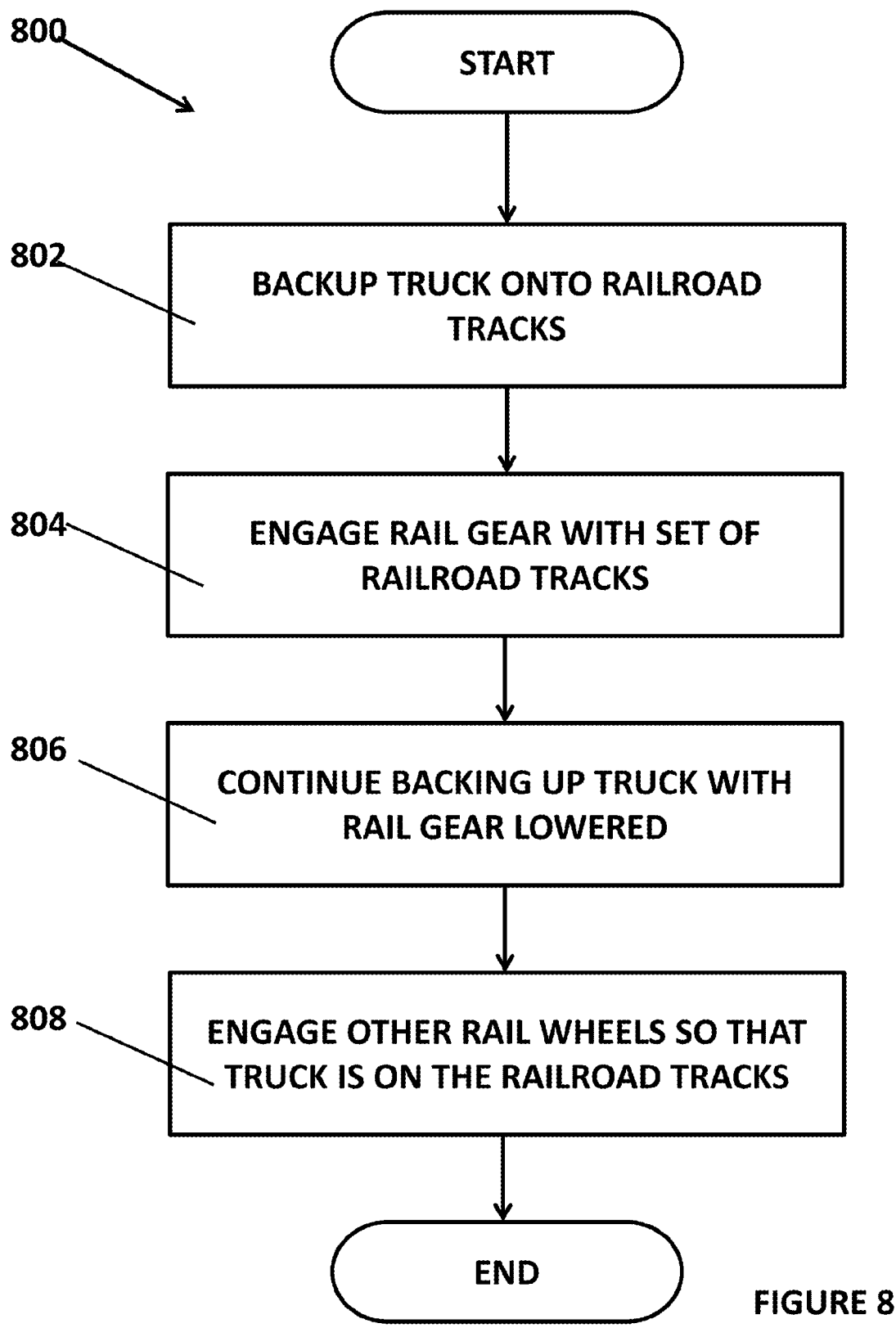
FIG. 8 illustrates a method for placing a truck onto the set of railroad tracks using the rotatable rail device.

FIG. 1 illustrates a truck 100 being placed onto a set of railroad tracks 102 using a rotatable rail device 104 and FIG. 8 illustrates a method 800 for placing a truck onto the set of railroad tracks using the rotatable rail device. As shown in FIG. 1, the rotatable rail device 104 (which is described below in more detail) is located adjacent the rear of the truck. In one embodiment shown in FIG. 1, the rotatable rail device 104 may be located in between the two set of rear wheels as shown in FIG. 1. Without the rotatable rail device 104, the truck 100 would need a siding 106 of a length of about 90 feet for a typical tractor trailer truck shown in FIG. 1. However, with the rotatable rail device 104, the truck can be placed onto the set of railroad tracks 102 in a siding 108 that may be about 40 feet long (more than ½ the length of the siding 106) as described below in more detail. At the end of placing the truck onto the set of railroad tracks using the rotatable rail device 104, the truck is engaged to the set of railroad tracks and can be pushed/pulled down the railroad tracks. In one example, the truck may be a tractor trailer truck (with a tractor 100a and a trailer 100b as shown in FIG. 2) that has one or more pieces of equipment and spools of cable/wire that may be used to install catenary or overhead wire along the set of railroad tracks.

Figure 2:
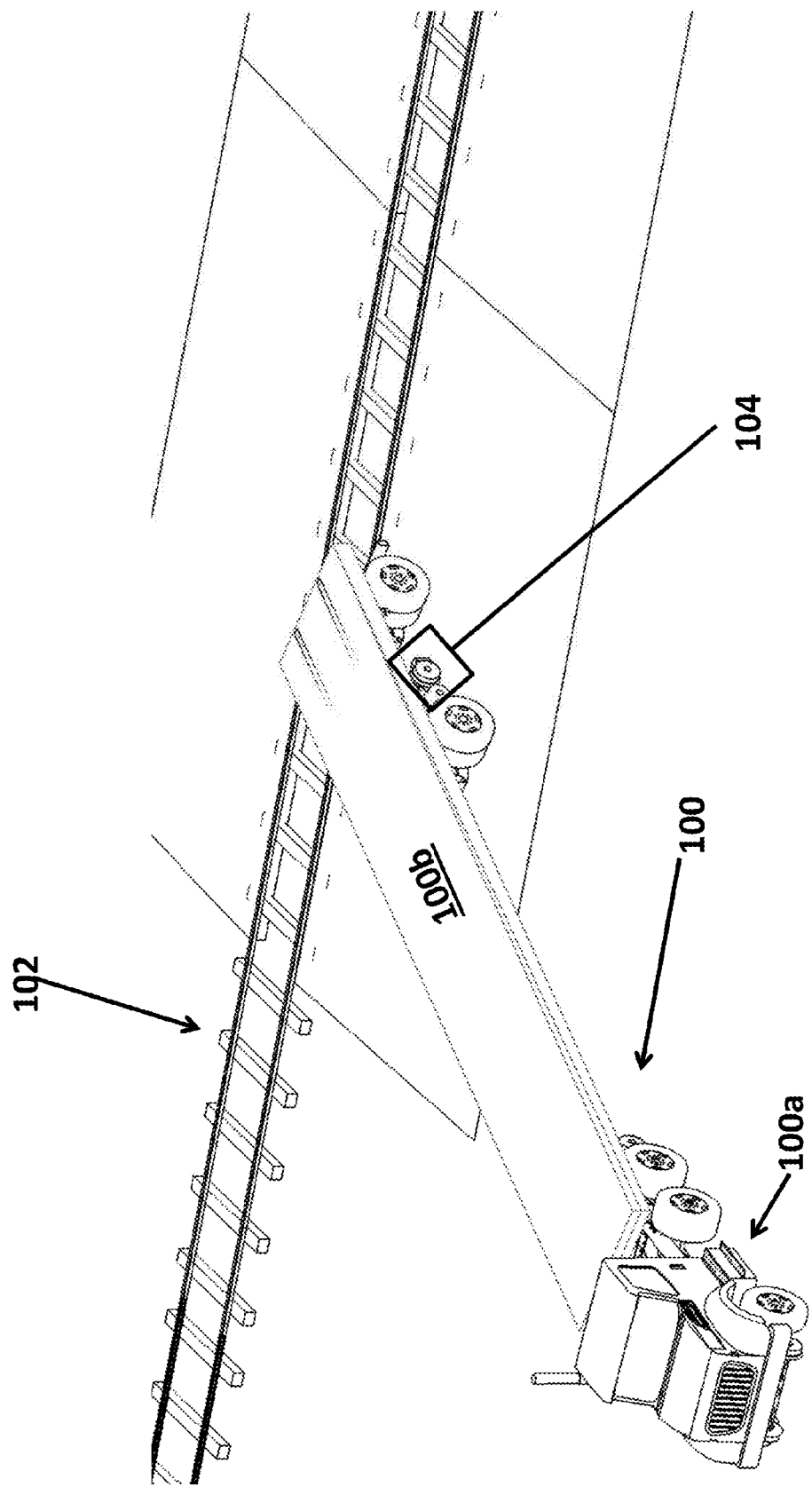
FIGS. 2 and 3 illustrate the truck being backed up onto the set of railroad tracks.
Figure 3:
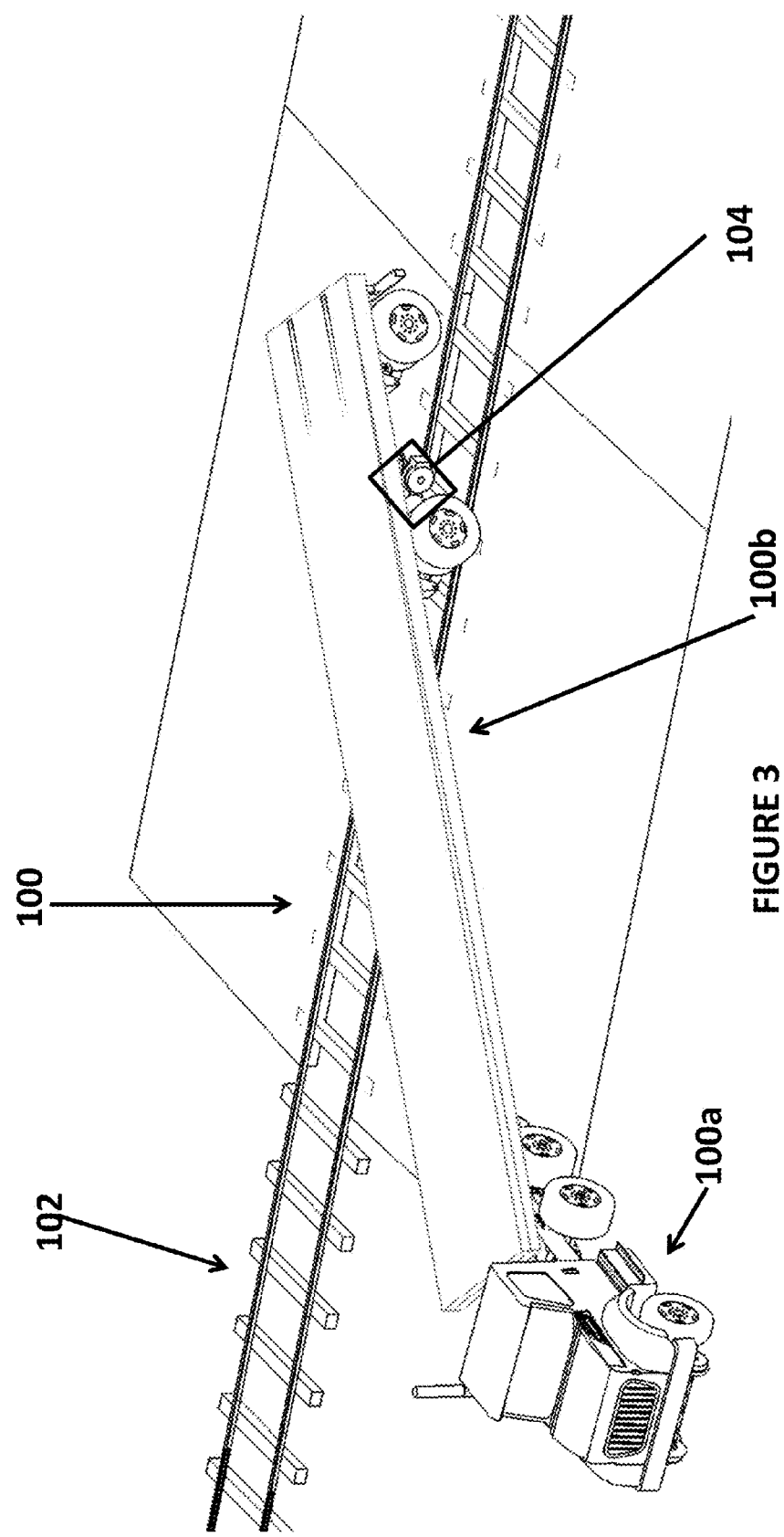
Figure 4:
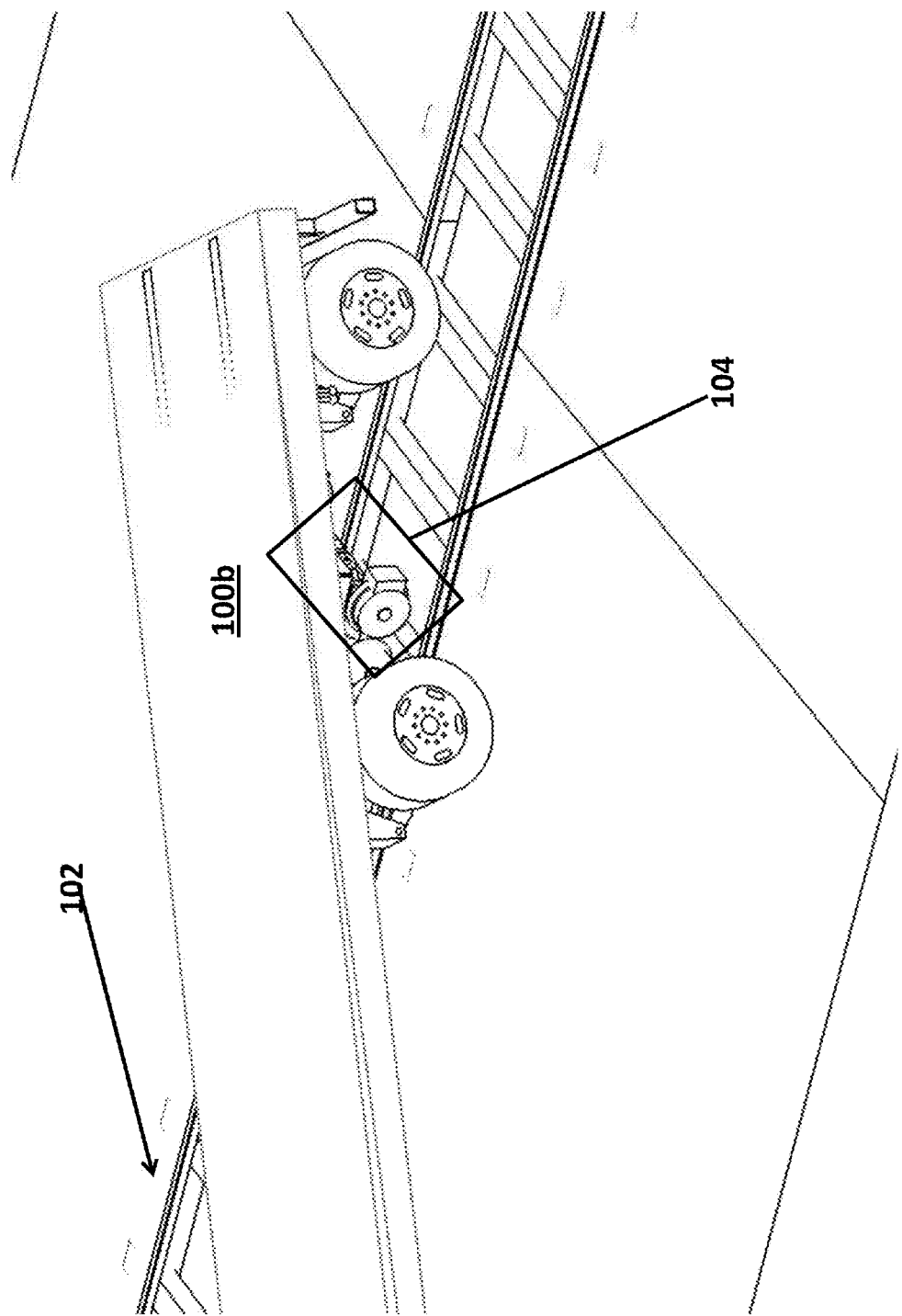
FIG. 4 illustrates a close up of the rotatable rail device that is positioned over the set of railroad tracks.

To place the truck onto the set of railroad tracks, the truck is backed up towards the set of railroad tracks (802) as shown in FIGS. 1-2 until the rotatable rail device 104 is over the set of railroad tracks as shown in FIG. 3 and a set of wheels of the rotatable rail device 104 are aligned with the set of railroad tracks as shown in FIG. 4. Note that, up to this point, the rotatable rail device 104 is an unengaged position (an over the road mode) in which the rotatable rail device 104 is locked in an up position so that the truck is being supported by the wheels of the truck and locked in a centered position so that the rotatable rail device 104 cannot rotate and the wheels of the rotatable rail device 104 are in-line with the wheels of the truck. Thus, the rotatable rail device 104 has a mechanism (described below in more detail) that allows the rotatable rail device 104 to be in a one or more locked positions in which the rotatable rail device 104 does not rotate and one or more unlocked positions in which the rotatable rail device 104 rotates relative to the truck. For example, the rotatable rail device 104 may be unlocked and freely rotate to permit the alignment of the rotatable rail device 104 with the set of tracks. Further, the rotatable rail device 104 may be locked and in a rail travel mode once the rotatable rail device 104 is engaged with the set of tracks in which the rotatable rail device 104 cannot freely rotate, but can rotate up to 20 degrees (10 degrees left or 10 degrees right) as the truck moves down the set of tracks. In an alternative embodiment, the engaged rotatable rail device 104 may be able to freely rotate when it is engaged with the set of tracks.

Figure 5:
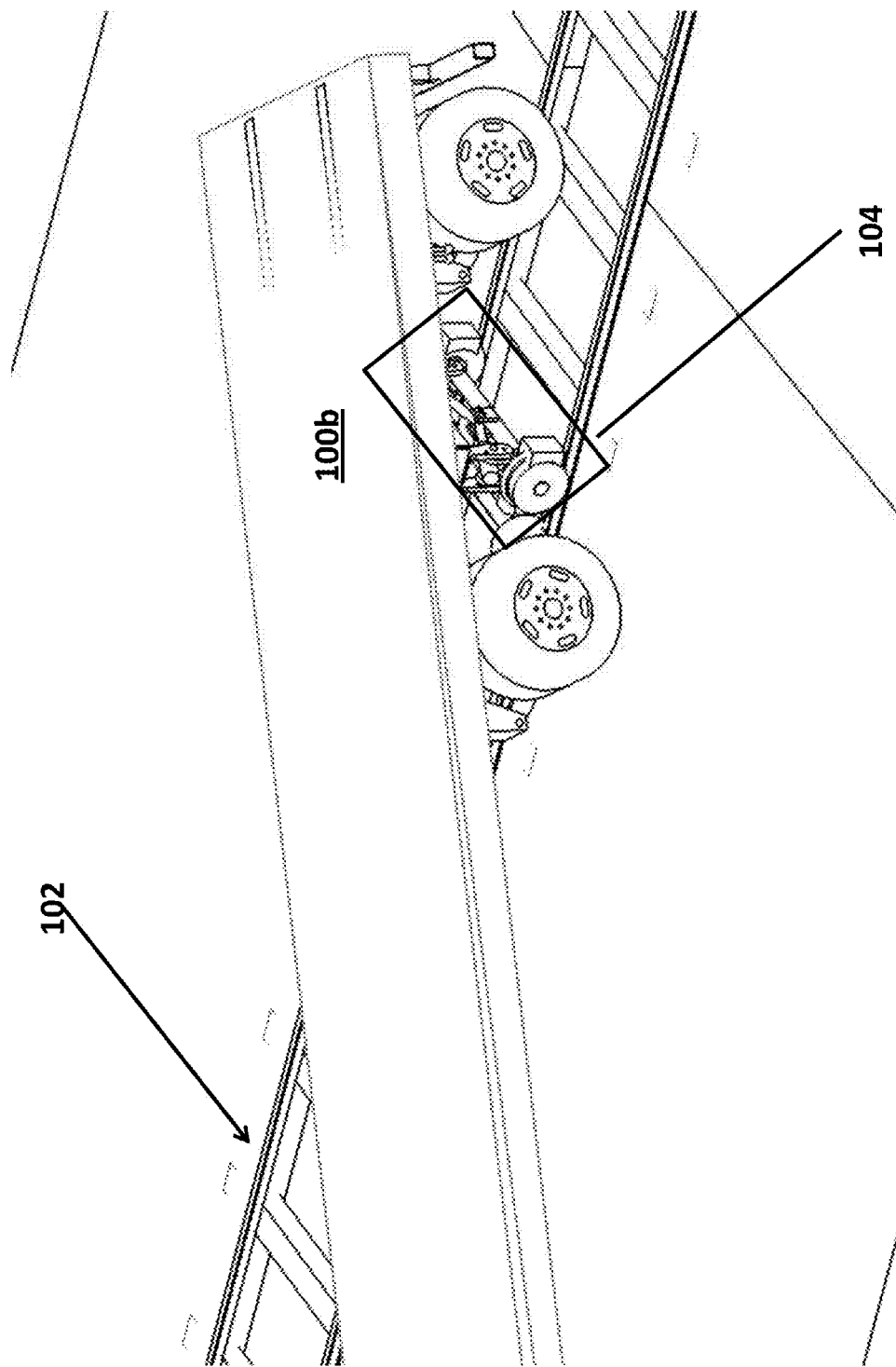
FIG. 5 illustrates a close up of the rotatable rail device that has been engaged with the set of railroad tracks.
Figure 6:
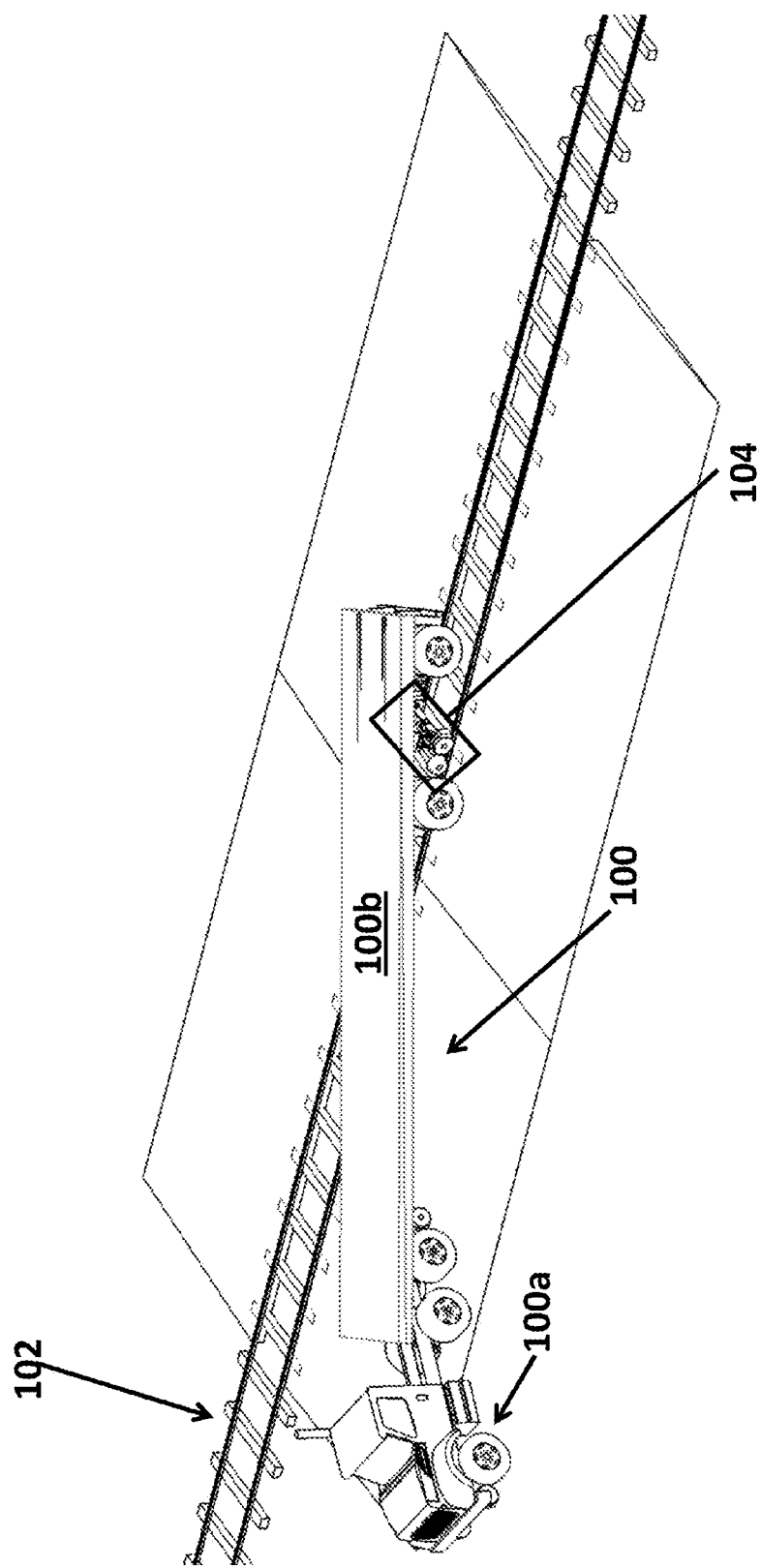
FIG. 6 illustrates the truck rear end rotation about the rotatable rail device that has been engaged with the set of railroad tracks.
Figure 7:
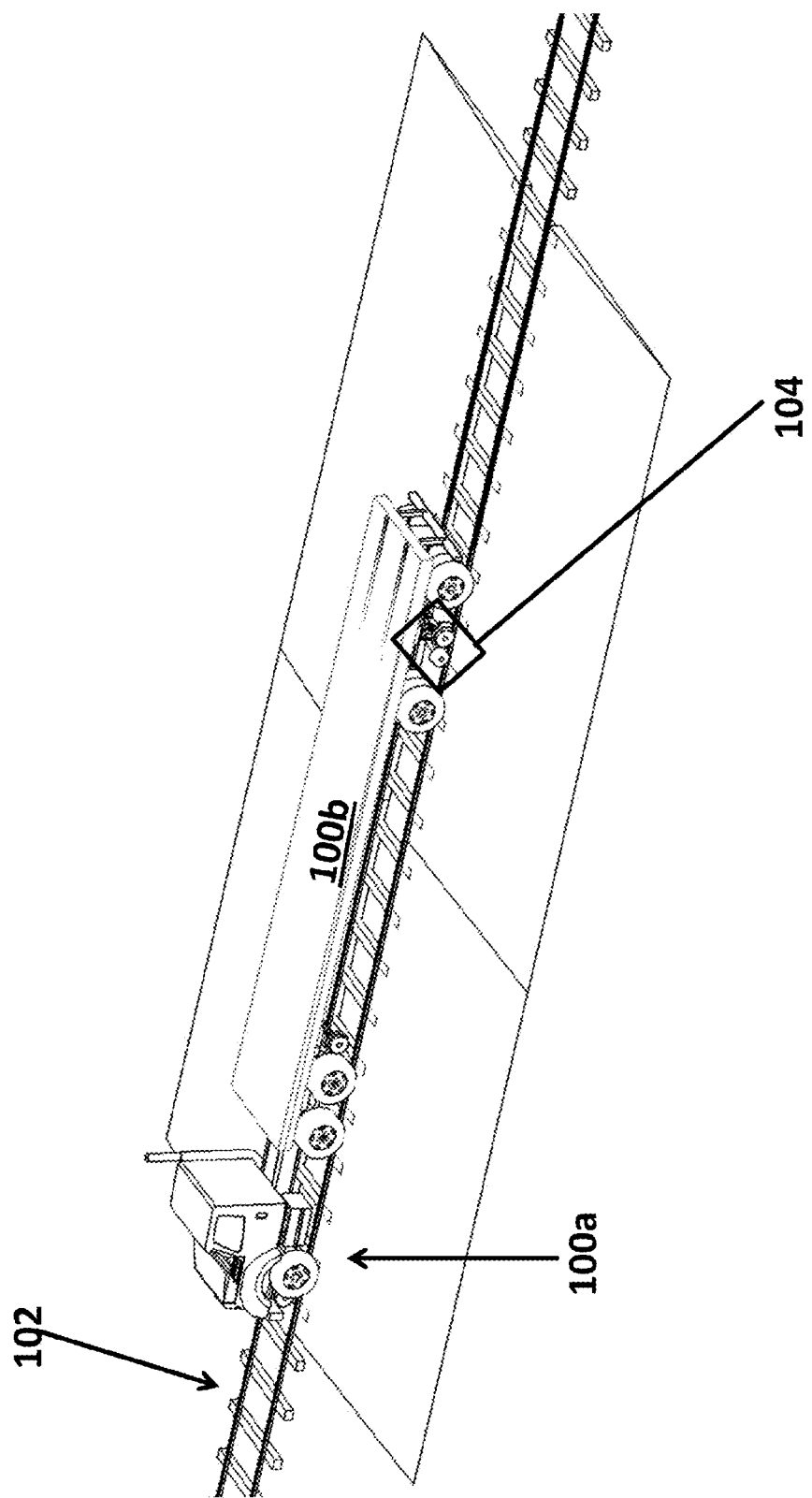
FIG. 7 illustrates the truck being placed onto the set of railroad tracks.

Once the set of wheels of the rotatable rail device 104 are aligned with the set of railroad tracks, the rotatable rail device 104 may be moved into an engaged position (804) so that the set of wheels of the rotatable rail device 104 are in contact with the set of railroad tracks as shown in FIG. 5. When the rotatable rail device 104 is in the engaged position, the one or more set of rear wheels of the truck are lifted off of the ground. Once the rotatable rail device 104 has been moved into an engaged position, the rotatable rail device 104 may be moved to the unlocked position that allows the rotatable rail device 104 to rotate relative to the trailer 100b. Thus, when the truck continues to back up (806) as shown in FIG. 6, the rear portion of the truck will rotate about the rotatable rail device and thus rotate until a long axis of the truck is aligned with the set of railroad tracks as shown in FIG. 7. Using the rotatable rail device 104, the truck may be placed onto the set of railroad tracks in a shorter distance or on a shorter siding than would be otherwise possible.

Once the truck is aligned with the set of railroad tracks, one or more additional set of wheels may be lowered onto the set of tracks (808) so that the truck now can be moved along the railroad tracks. Furthermore, as described above, the rotatable rail device 104 may be placed into a rail travel mode in which it may be locked, but able to rotate 20 degrees or may be unlocked and able to freely rotate.

Figure 9:
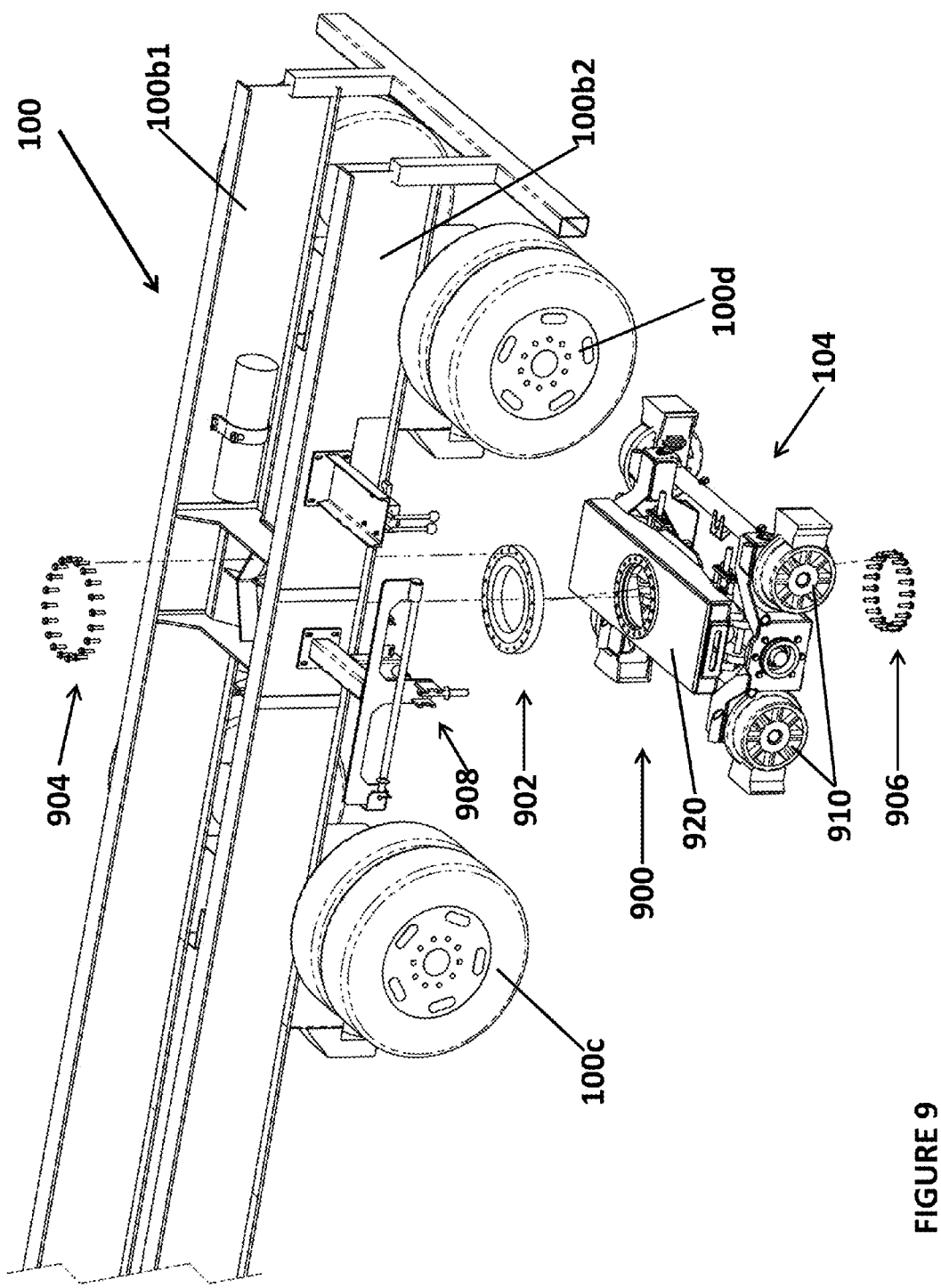
FIG. 9 is an exploded assembly diagram of an example of the rotatable rail device being installed on a truck.

FIG. 9 is an exploded assembly diagram of an example of the rotatable rail device 104 being installed on a truck 100. FIGS. 10A and 10B are a close up side view and top view, respectively of the rotatable rail device 400. In this example, the truck 100 may be a tractor trailer truck and may have a first and second frame portion 100b1, 100b2 of the trailer and a first and second set of rear wheels 100c, 100d wherein the rotatable rail device 104 is rotatable attached to the truck 100 in between the two set of rear wheels 100c, 100d. The rotatable rail device 104 may have a rail device 900 and a rotation mechanism 902 that rotatable couples the rail device 900 to the truck 100. In one embodiment, the mechanism 902 may be a bearing. As shown in the example in FIG. 9, the rotation mechanism 902 may be connected to the truck using one or more attachment devices 904, such as bolts and may also be connected to the rail device 900 by one or more attachment devices 904, such as bolts. It should be understood that the rail device 900 may be coupled to the truck by other mechanisms. The rotation mechanism 902 allows the rail device 900 to rotate relative to the truck 100 when the rail device is in the unlocked position based on a position of a locking mechanism 908 that is described in more detail with reference to FIG. 11. The rail device 900 may have one or more set of railroad wheels 910, such as the two set of wheels shown in FIG. 9, that can be engaged with a set of railroad tracks. The rail device 900 may also have a top portion 920 onto which the rotation mechanism 902 is secured.

Figure 11:
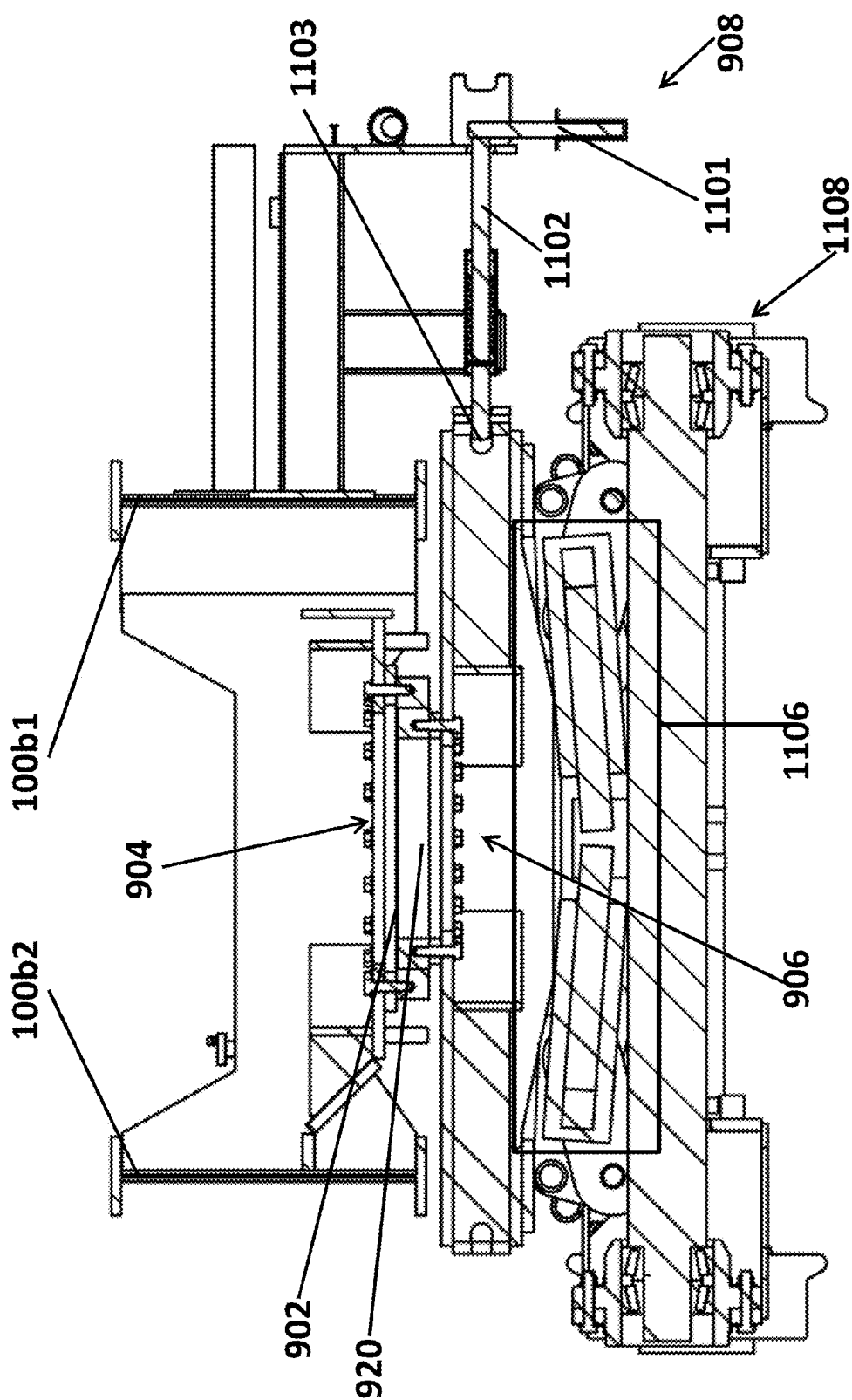
FIG. 11 is a close up cross-sectional view of the rotatable rail gear along line A-A in FIG. 10A.

FIG. 11 is a close up cross-sectional view of the rail device 900 along line A-A in FIG. 10A. As shown in FIG. 11, the rail device 900 is mounted, in this implementation, in between the two frame portions 100b1, 100b2 of the trailer 100b. The rail device 900 may further comprises a wheel carriage portion 1108 and an actuation portion 1106 that is connected to the wheel carriage portion 1108 wherein the wheel carriage portion 1108 includes the set of wheels 910 while the actuation portion 1106 moves the rail device 900 from an unengaged position to an engaged position as described in more detail with reference to FIGS. 12A-17.

As shown in FIG. 11, the locking mechanism 908 may include a control lever 1101 that is connected to a control rod 1102. The top portion 920 of the rail device 900 may have an indent 1103 that interfaces with an end of the control rod 1102. Thus, in the locked position, the end of the control rod 1102 may be within the indent 1103 and thus prevents the rail device 900 from being rotated. In the unlocked position, the end of the control rod 1102 is not within the indent 1103 that this allows the rail device 900 to rotate relative to the truck to which the rail device 900 is attached. In one implementation of the locking mechanism 908, the control lever 1101 may be pushed towards the truck frame which causes the end of the control rod 1102 to move out of the indent and this unlock the rail device 900.

FIG. 12A is a side view of the rotatable rail device in a unengaged position and FIG. 12B is a side view of the rotatable rail device in an engaged position. In the unengaged position, the wheels 910 in the carriage portion 1108 of the rail device 900 are above the wheels of the truck 100c, 100d so that the truck is resting of the truck wheels. In contrast, when the rail device 900 is in the engaged position as shown in FIG. 12B, the wheels 910 of the rail device 900 are lower than the truck wheels so that the truck is resting of the wheels of the rail device. As described in more detail below, the rail device 900 may be moved between the engaged position and the unengaged position by the actuation portion 1106 that has a first position for the unengaged position as shown in FIG. 12A and a second, expanded position for the engaged position as shown in FIG. 12B. Now, the rail device in the engaged position and in the unengaged position are described in more detail.

Figure 15:
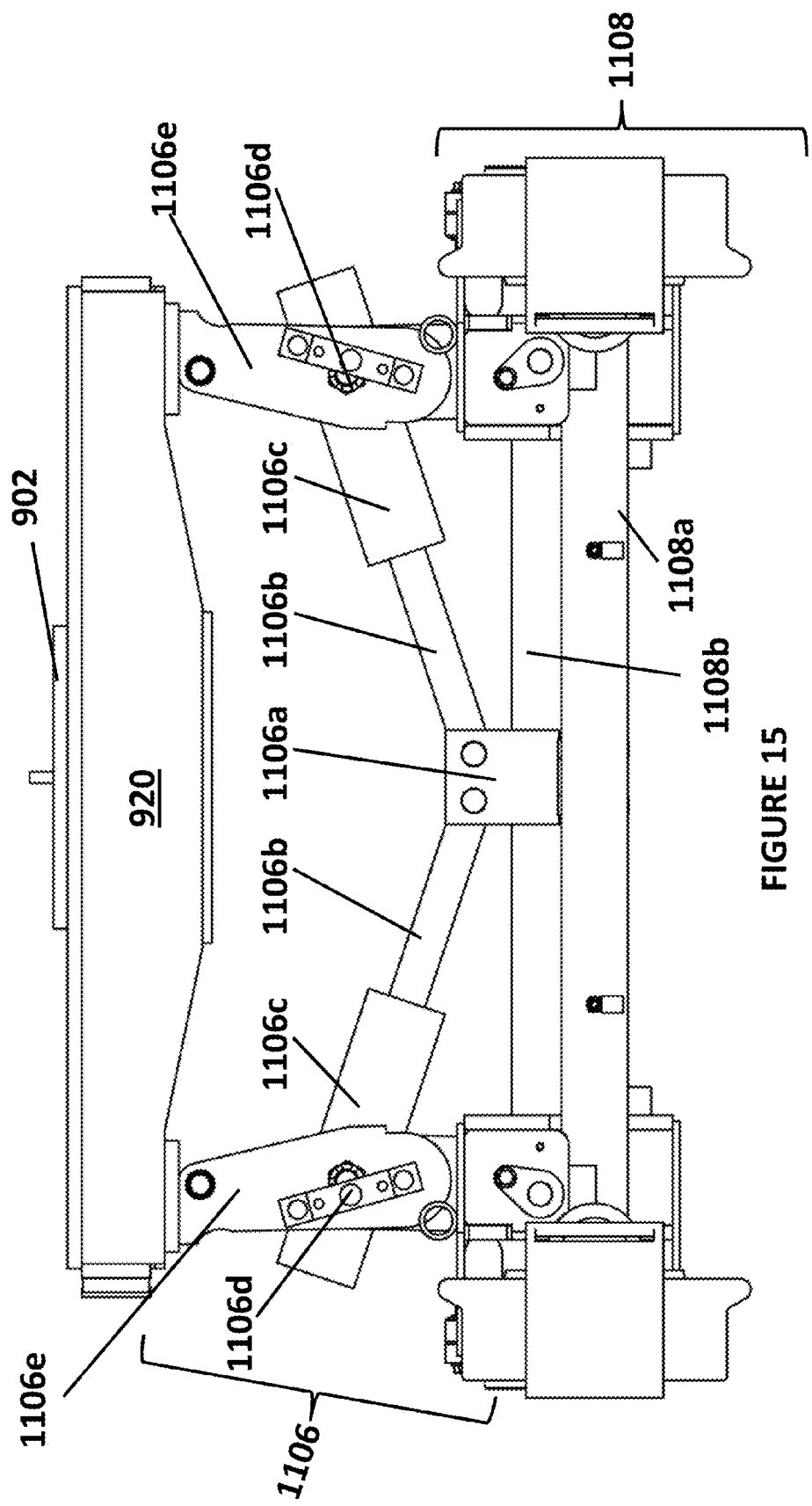
FIG. 15 is an end view of the rotatable rail device in the engaged position.
Figure 16:
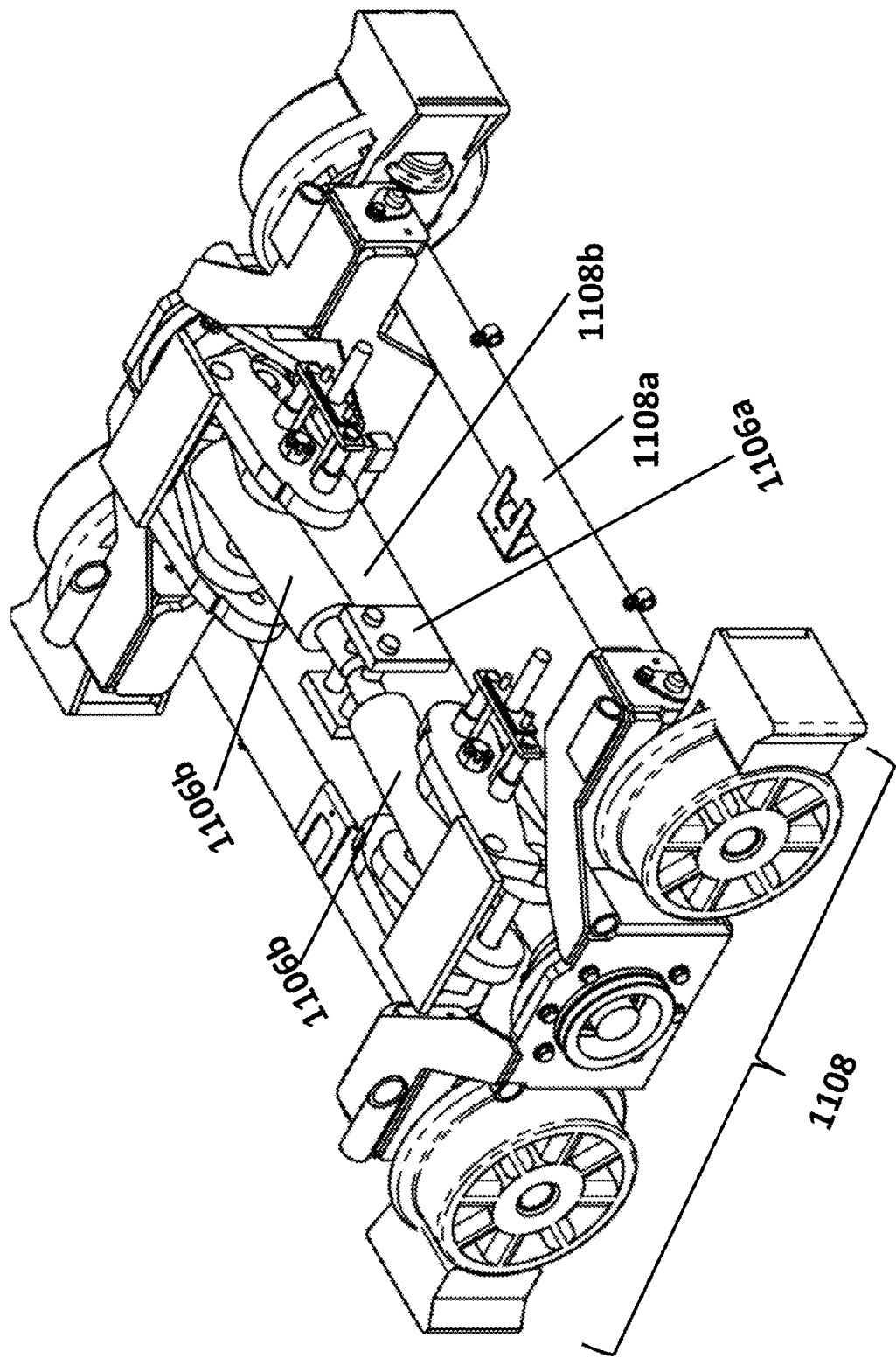
FIG. 16 illustrates the rotatable rail device in an unengaged position.

FIGS. 13 and 14 are a perspective view and a side view, respectively of the rotatable rail device in an engaged position and FIG. 15 is an end view of the rotatable rail device in the engaged position while FIG. 16 illustrates the rotatable rail device in an unengaged position. The carriage portion 1108 of the rail device has the one or more wheels 910, one or more axles 1108a that couple the set of wheels 910 on each side of the rail device to each other and allow the set of wheels 910 to rotate and a structural member 1108b that is connected to the actuator portion 1106 to secure the actuation portion 1106 to the carriage portion 1108. The actuator portion 1106 sits between the carriage portion 1108 and the top portion 920 (to which the rotation mechanism 902 is coupled). The actuator portion 1106 may have a connector 1106a, a first and second actuator arm 1106b and a first and second actuator 1106c connected to each actuator arm 1106b. Each actuator 1106c may be coupled to a pivot point 1106d as shown of a member 1106e. In one implementation, the first and second actuator 1106c may be well known hydraulic actuator. In operation, the actuator portion 1106 may raise or lower the top portion 920 (and thus the truck that is connected to the top portion 920) by actuating the first and second actuators 1106c which cause the members 1106e to rotate from a collapsed position when the rail device 900 is in the unengaged position to an upright position when the rail device 900 is in the engaged position.

Figure 17:
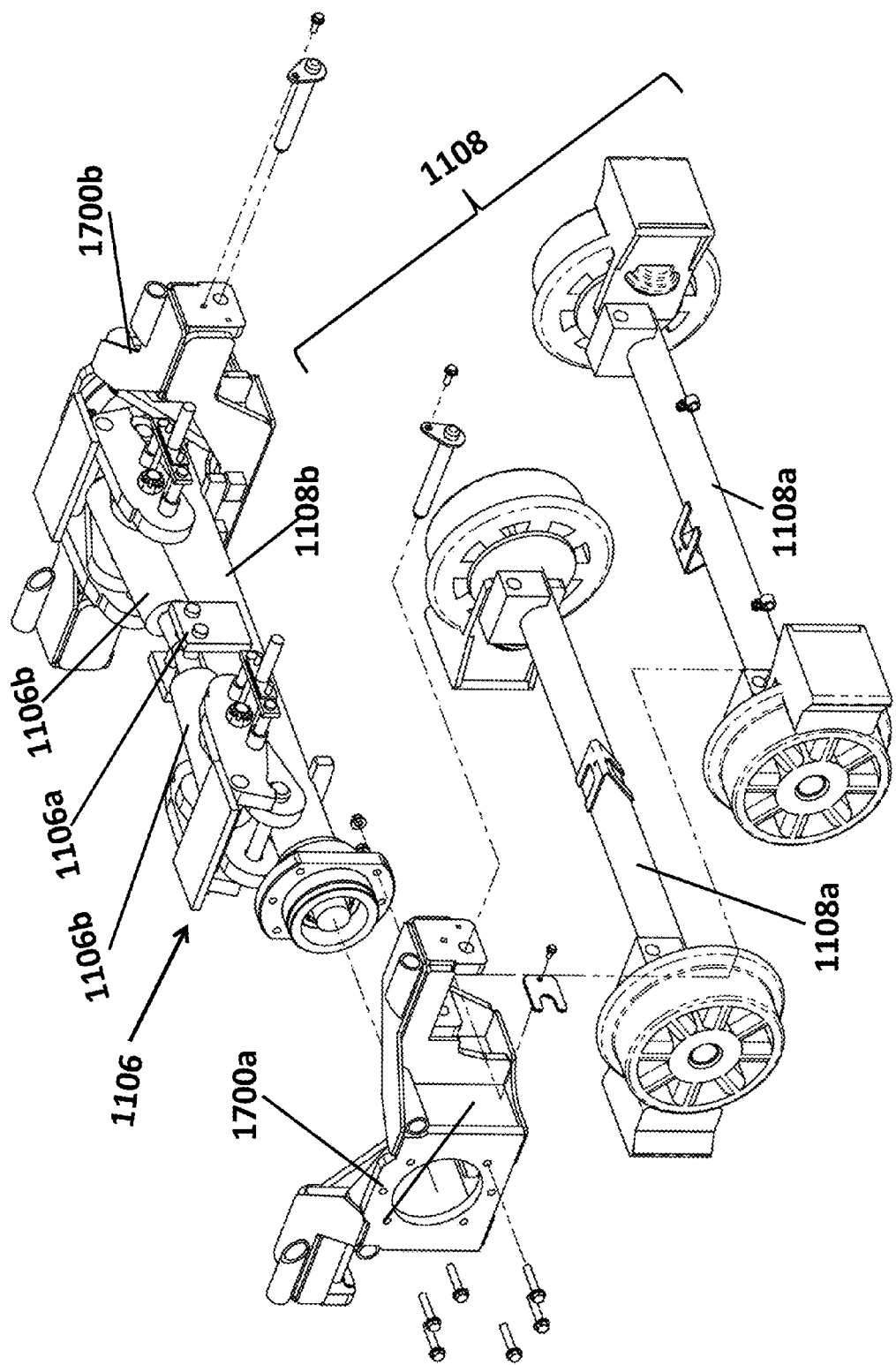
FIG. 17 is an exploded assembly diagram of the rotatable rail device.

FIG. 17 is an exploded assembly diagram of the rotatable rail device 900 that shows the details of the connection between the wheel carriage 1108 and the actuator portion 1106. The rail device 900 may have a first and second frame member 1700a, 1700b at each side of the rail device 900 that connect the wheel carriage 1108 to the actuator portion 1106.

Figure 18:
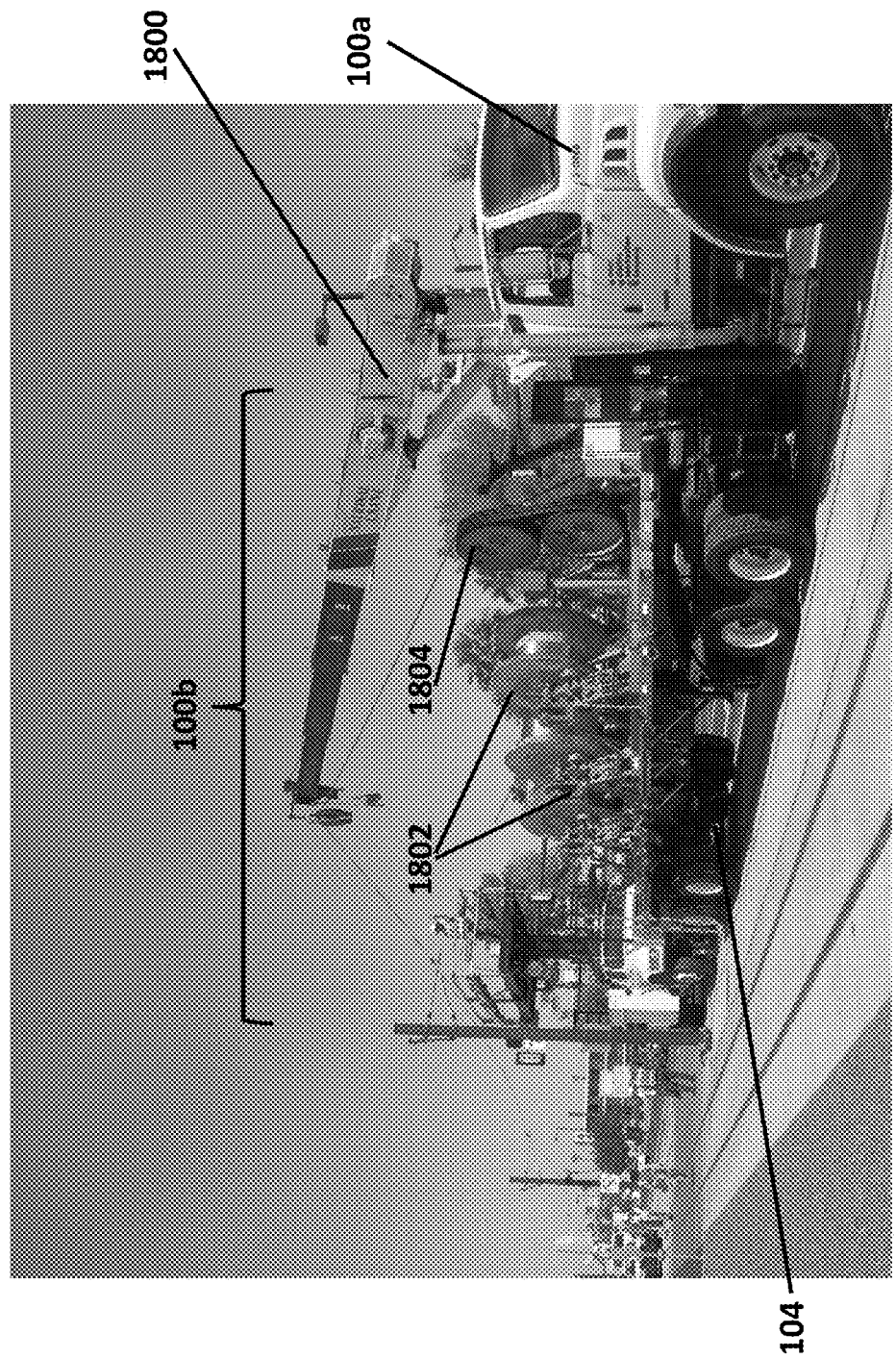
FIG. 18 illustrates a catenary installation truck that may incorporate the rotatable rail device.

FIG. 18 illustrates a catenary installation truck that may incorporate the rotatable rail device 104 that has been mounted onto a set of tracks, such as light rail tracks. The catenary installation truck has the tractor 100*a* and the trailer 100*b* which are mounted onto the set of tracks using the rotatable rail device 104 and the other set of track wheels. The catenary installation truck may be used to install catenary cable/wire and the standards that hold the wire/cable, such as for a lightrail system or an electric powered train or other electric powered transport. The catenary installation truck may have a crane 1800, one or more spools 1802 of the catenary wire/cable and a cabling device 1804 mounted to the trailer of the catenary installation truck.

While the foregoing has been with reference to a particular embodiment of the invention, it will be appreciated by those skilled in the art that changes in this embodiment may be made without departing from the principles and spirit of the disclosure, the scope of which is defined by the appended claims.

The invention claimed is:

1. A method for placing a truck on a set of tracks, comprising:
   backing a truck onto a set of tracks;
   engaging a rotatable rail device located at a back portion of the truck adjacent a rear set of wheels with the set of tracks, the rotatable rail device having a rotation mechanism has a first unlocked position in which the rotation mechanism rotates freely relative to the truck and a second unlocked position in which the rotation mechanism is rotatable in a limited arc when the rail device is engaged with the track;
   maintaining the rotation mechanism in the first unlocked position;
   rotating the truck about the rotatable rail device using the rotation mechanism as the truck is backed up onto the set of tracks wherein the truck is placed onto the set of tracks on a short siding; and
   placing the rotation mechanism on the rotatable rail device into the second unlocked position in which the rotation mechanism is rotatable in a limited arc when the rotatable rail device is engaged with a track of the set of tracks.

2. The method of claim 1 further comprising engaging one or more set of rail wheels on the truck once a longitudinal axis of the truck is aligned with the set of tracks so that the truck can run on the set of tracks.

3. The method of claim 1, wherein rotating the truck about the rotatable rail device further comprises rotating a trailer portion of the truck about the rotatable rail device.

4. The method of claim 2, wherein rotating the truck about the rotatable rail device further comprises releasing a locking mechanism that allows the truck to rotate when the rotatable rail device is engaged.

5. The method of claim 4 further comprising engaging the locking mechanism when the longitudinal axis of the truck is aligned with the set of tracks.

6. The method of claim 1, wherein engaging a rotatable rail device further comprises moving a set of wheels of the rotatable rail device so that the truck is being supported by the set of wheels of the rotatable rail device and is not being supported by the rear set of wheels of the truck.

7. The method of claim 1, wherein the set of tracks is a set of railroad tracks.

8. The method of claim 3 further comprising attaching the rotatable rail device to the trailer portion of the truck.

* * * * *